(12) United States Patent
Thendie et al.

(10) Patent No.: US 11,040,880 B2
(45) Date of Patent: Jun. 22, 2021

(54) HEXAGONAL BORON NITRIDE POWDER AND METHOD FOR PRODUCING THE SAME, AND COMPOSITION AND HEAT DISSIPATION MATERIAL USING THE SAME

(71) Applicant: SHOWA DENKO K.K., Tokyo (JP)

(72) Inventors: Boanerges Thendie, Shiojiri (JP); Masaru Fukasawa, Shiojiri (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/647,756

(22) PCT Filed: Jun. 12, 2019

(86) PCT No.: PCT/JP2019/023200
§ 371 (c)(1),
(2) Date: Mar. 16, 2020

(87) PCT Pub. No.: WO2020/049817
PCT Pub. Date: Mar. 12, 2020

(65) Prior Publication Data
US 2020/0277189 A1    Sep. 3, 2020

(30) Foreign Application Priority Data
Sep. 7, 2018 (JP) ............................. JP2018-168276

(51) Int. Cl.
*C01B 21/064* (2006.01)
(52) U.S. Cl.
CPC ...... *C01B 21/0648* (2013.01); *C01P 2002/74* (2013.01); *C01P 2004/30* (2013.01);
(Continued)

(58) Field of Classification Search
None
See application file for complete search history.

(56) References Cited

U.S. PATENT DOCUMENTS

| 4,749,556 A | 6/1988 | Parrish et al. |
| 10,106,413 B2 | 10/2018 | Ikemiya et al. |

(Continued)

FOREIGN PATENT DOCUMENTS

| EP | 0 336 997 A1 | 10/1989 |
| EP | 2 966 036 A1 | 1/2016 |

(Continued)

OTHER PUBLICATIONS

Communication dated Aug. 13, 2020, from the European Patent Office in application No. 19817574.7.
(Continued)

Primary Examiner — Colin W. Slifka
(74) Attorney, Agent, or Firm — Sughrue Mion, PLLC

(57) ABSTRACT

A hexagonal BN powder including aggregates of primary particles of hexagonal BN containing boron and oxygen as impurity elements at a content of 1.00 to 30.00% and 0 to 1.00% by mass, respectively, which has a peak A in a predetermined particle diameter range and a 50% volume cumulative particle diameter $D_{50}$ (d1) of 30.0 to 200.0 μl in a particle size distribution curve, and in which a ratio of a height (a1) of the peak A before treatment to a height (a2) of the peak A after treatment is 0.80 to 1.00 and a ratio of $D_{50}$ (d1) before treatment to $D_{50}$ (d2) after treatment is 0.80 to 1.00 when the hexagonal BN powder is ultrasonically treated under a predetermined condition for 1 minute. Also disclosed is a method for producing the hexagonal BN powder, a composition and a heat dissipation material.

13 Claims, 7 Drawing Sheets

(52) U.S. Cl.
CPC ...... *C01P 2004/51* (2013.01); *C01P 2004/61* (2013.01); *C01P 2006/12* (2013.01); *C01P 2006/16* (2013.01); *C01P 2006/32* (2013.01)

(56) References Cited

U.S. PATENT DOCUMENTS

| | | |
|---|---|---|
| 2010/0069223 A1 | 3/2010 | Prilutsky et al. |
| 2018/0201818 A1 | 7/2018 | Otsuka et al. |
| 2018/0354792 A1 | 12/2018 | Otsuka et al. |

FOREIGN PATENT DOCUMENTS

| | | |
|---|---|---|
| JP | 2017-014064 A | 1/2017 |
| WO | 2015/119198 A1 | 8/2015 |
| WO | 2017/038512 A1 | 3/2017 |
| WO | 2017/145869 A1 | 8/2017 |
| WO | 2018/123788 A1 | 7/2018 |

OTHER PUBLICATIONS

International Search Report for PCT/JP2019/023200 dated Sep. 17, 2019 (PCT/ISA/210).
Written Opinion of the International Searching Authority for PCT/JP2019/023200 dated Sep. 17, 2019 (PCT/ISA/237).

HEXAGONAL BORON NITRIDE POWDER AND METHOD FOR PRODUCING THE SAME, AND COMPOSITION AND HEAT DISSIPATION MATERIAL USING THE SAME

CROSS REFERENCE TO RELATED APPLICATIONS

This application is a National Stage of International Application No. PCT/JP2019/023200 filed Jun. 12, 2019, claiming priority based on Japanese Patent Application No. 2018-168276, filed Sep. 7, 2018.

TECHNICAL FIELD

The present invention relates to a hexagonal boron nitride (hereinafter also referred to as "h-BN") powder comprising aggregates of primary particles of h-BN and a method for producing the same, and a composition and a heat dissipation material using the h-BN powder.

BACKGROUND ART h-BN particles have a layered structure similar to that of graphite and are excellent in characteristics such as thermal conductivity, electrical insulation properties, heat resistance, corrosion resistance, and lubricity-releasability. Therefore, h-BN particles are used as a filler of an insulating heat dissipation material of a resin, a rubber, or the like (hereinafter also collectively referred to as a "resin or the like"), a solid lubricant, a solid release agent, a raw material for h-BN sintered body production, or the like.

As the method for producing the h-BN powder, there are known, for example, (1) a method involving directly nitriding boron by use of nitrogen, ammonia or the like, (2) a method involving reacting boron halide with ammonia or an ammonium salt, (3) a method involving reacting a boron compound such as boron oxide with a nitrogen-containing organic compound such as melamine, for reduction-nitridation, and (4) a method involving heating a boron compound with a carbon source under a nitrogen atmosphere at a high temperature of 1600° C. or more, for reduction-nitridation.

Various h-BN particles or h-BN powders having particular shape, particle diameter and the like are proposed as those effective from the viewpoint of enhancements in thermal conductivity and insulation properties of the insulating heat dissipation material in a case where those are added as fillers of insulating heat dissipation materials to resins or the like.

For example, Patent Literature 1 describes the following: a resin formed body (heat dissipation sheet) high in thermal conductivity can be produced using an h-BN powder having a card house structure, in which the powder is large in crystallite diameter and large in orientation properties on a predetermined crystal plane of primary particles.

Patent Literature 2 describes the following: h-BN particles having a polyhedral structure allow for a reduction in thermal anisotropy in a plane direction, originally possessed in an h-BN crystal, and, when used for filling a resin therewith, allow for exhibition of high thermal conductivity and a reduction of deterioration in insulation properties of the resin.

CITATION LIST

Patent Literature

PTL1: WO 2015/119198
PTL2: JP 2017-14064 A

SUMMARY OF INVENTION

Technical Problem

Such an h-BN powder large in particular orientation properties and crystallite diameter of primary particles, as described in Patent Literature 1, is large in specific surface area, easily causes a number of fine voids to be formed between particles aggregated, and results in deterioration in insulation properties of a formed body of a resin or the like added.

On the other hand, such h-BN particles having a polyhedral structure as a surface profile, as described in Patent Literature 2, have a small specific surface area and hardly cause the above voids to be formed, but cannot achieve sufficient aggregation strength. Thus, when such particles are added to a resin or the like to produce a formed body, each face of a polyhedron of the polyhedral structure is oriented by an external force, easily resulting in a reduction in thermal conductivity of the formed body.

The present invention has been made in order to solve the above problems, and it is an object of the present invention to provide an h-BN powder which, when used as a filler of an insulating heat dissipation material of a resin or the like, can impart not only high thermal conductivity, but also high dielectric strength, to the insulating heat dissipation material, and a method for producing the same. It is also an object of the present invention to provide a composition using the h-BN powder, and a heat dissipation material excellent in thermal conductivity and insulation properties.

Solution to Problem

The present invention is based on the finding that when an h-BN powder comprising aggregates of primary particles of h-BN, the aggregates having predetermined particle size distribution and aggregation strength obtained by undergoing a step of melting the surface of a granulated powder, is used as a filler of an insulating heat dissipation material of a resin or the like, the insulating heat dissipation material exhibits high thermal conductivity and high dielectric strength.

Specifically, the present invention provides the following [1] to [10].

[1] A hexagonal boron nitride powder comprising an aggregate of primary particles of hexagonal boron nitride, comprising boron as an impurity element at a content of 1.00 to 30.00% by mass and oxygen as an impurity element at a content of 0 to 1.00% by mass, and having a peak in a particle diameter range of 10.0 μm or more and less than 100.0 μm and a 50% volume cumulative particle diameter $D_{50}$ (d1) of 30.0 to 200.0 μm in a particle size distribution curve representing volume-based frequency distribution, a ratio of a height (a1) of the peak before treatment to a height (a2) of the peak after treatment, a2/a1, being 0.80 to 1.00 and a ratio of a 50% volume cumulative particle diameter $D_{50}$ (d1) before treatment to a 50% volume cumulative particle diameter $D_{50}$ (d2) after treatment, d2/d1, being 0.80 to 1.00, when the hexagonal boron nitride powder is ultrasonically treated under the following condition 1 for 1 minute,

[condition 1] a powder sample dispersion obtained by mixing 0.06 g of the hexagonal boron nitride powder, 0.005 g of a detergent ("Mama Lemon (registered trademark)", manufactured by Lion Corporation) and 50 g of water (20° C.) is placed in a 50 mL glass beaker having a barrel inner diameter of 40 mm and a height of 60 mm, and an end of a tip of a vibrator of an ultrasonic generator is set at a height of 1 cm from a bottom surface of a central portion of the beaker, and ultrasonic treatment is performed at an output of 150 W and an oscillation frequency of 19.5 kHz.

[2] The hexagonal boron nitride powder according to the above [1], having a BET specific surface area of 0.1 $m^2/g$ or more and less than 5.0 $m^2/g$, and the primary particles each having a turtle shell shaped like surface.

[3] The hexagonal boron nitride powder according to the above [1] or [2], having a crystallite diameter derived from a (002) plane of hexagonal boron nitride, as determined by powder X-ray diffraction measurement, of 250 Å or more and less than 375 Å.

[4] A method for producing the hexagonal boron nitride powder according to any one of the above [1] to [3], comprising step 1 of preparing a mixed powder comprising a boron powder and one or two or more boron compounds selected from the group consisting of a boron oxoacid and boron oxide, step 2 of calcining the mixed powder under a noble gas atmosphere at 1200° C. or more and less than 1800° C. to obtain a calcined powder, step 3 of granulating the calcined powder to obtain a granulated powder having a particle diameter of 10 to 200 μm, step 4 of melting the granulated powder under a noble gas atmosphere at 1800 to 2300° C. to obtain a molten powder, and step 5 of firing the molten powder under a nitrogen gas atmosphere at 2000 to 2300° C. to obtain a hexagonal boron nitride powder.

[5] The method for producing the hexagonal boron nitride powder according to the above [4], wherein the calcined powder obtained in the step 2 comprises boron suboxide.

[6] The method for producing the hexagonal boron nitride powder according to the above [4] or [5], wherein in the step 3, at least any of boron oxide and hexagonal boron nitride is added to the calcined powder for granulation.

[7] A composition comprising a base material comprising one or two or more selected from the group consisting of a resin and a rubber, and the hexagonal boron nitride powder according to any one of [1] to [3].

[8] A heat dissipation material comprising the composition according to the above [7].

[9] The heat dissipation material according to the above [8], being formed a heat dissipation sheet.

[10] The heat dissipation material according to the above [9], wherein a ratio of a diffraction peak intensity (I(002)) of a (002) plane to a diffraction peak intensity (I(100)) of a (100) plane, I(002)/I(100), of primary particles of hexagonal boron nitride, as determined in a direction perpendicular to a thickness direction of the heat dissipation sheet by X-ray diffraction measurement, is 7.0 to 15.

Advantageous Effects of Invention

According to the present invention, it is possible to provide an h-BN powder which, when used as a filler of an insulating heat dissipation material of a resin or the like, can impart high thermal conductivity and high dielectric strength to the insulating heat dissipation material, and a method for producing the same.

Therefore, the composition of the present invention using the h-BN powder can provide a heat dissipation material excellent in thermal conductivity and insulation properties.

DESCRIPTION OF EMBODIMENTS

Figure 1:
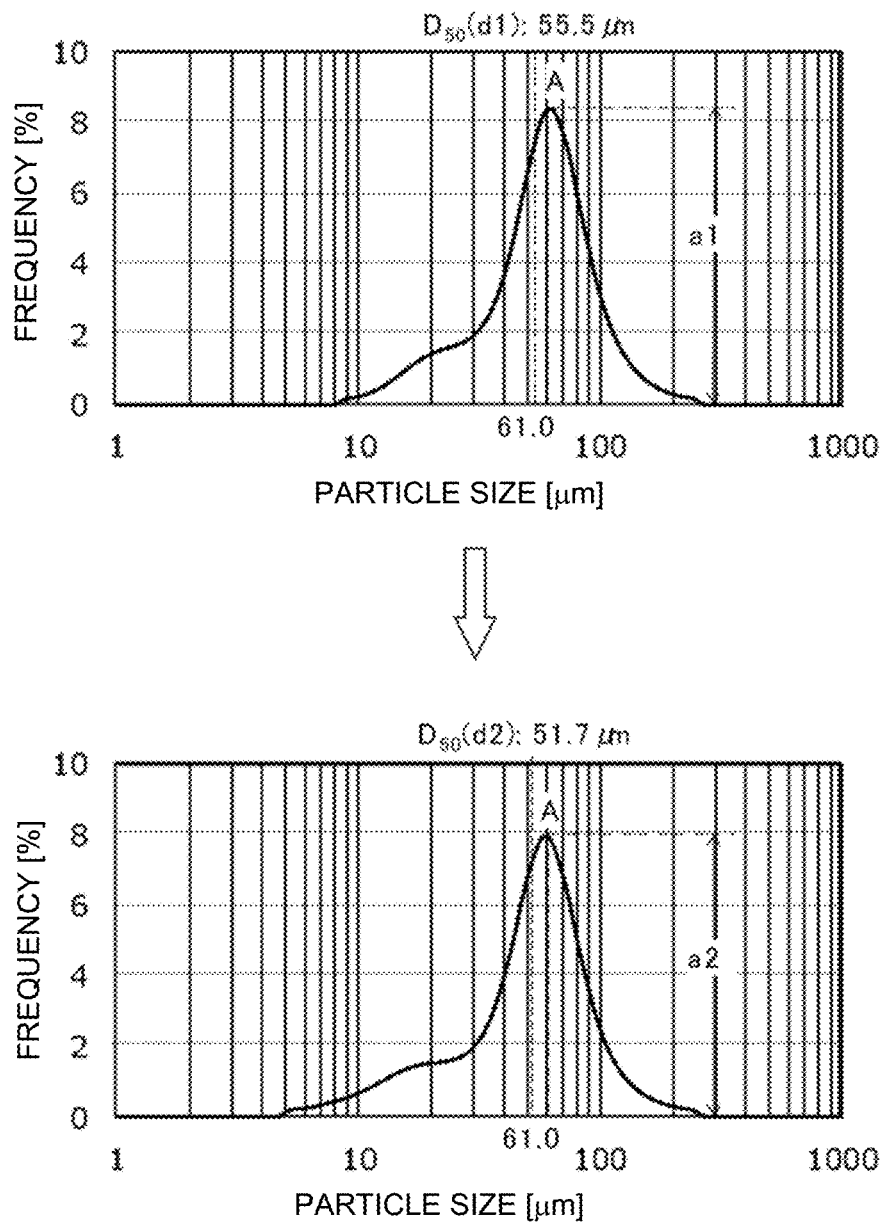
FIG. 1 shows the change in particle size distribution curve according to ultrasonic treatment of an h-BN powder of Example 1. The particle size distribution curve before the ultrasonic treatment is on the left side, and the particle size distribution curve after the ultrasonic treatment is on the right side.

An h-BN powder and a method for producing the same, and a composition and a heat dissipation material using the h-BN powder according to the present invention will be described in detail below.

[Hexagonal Boron Nitride (h-BN) Powder]

The h-BN powder of the present invention comprises aggregates of primary particles of h-BN. The h-BN powder comprises boron as an impurity element at a content of 1.00 to 30.00% by mass and oxygen as an impurity element at a content of 0 to 1.00% by mass. The particle size distribution curve representing volume-based frequency distribution of the h-BN powder has a peak in the particle diameter range of 10.0 μm or more and less than 100.0 μm and the h-BN powder has a 50% volume cumulative particle diameter $D_{50}$ (hereinafter simply referred to as "$D_{50}$".) (d1) of 30.0 to 200.0 μm. The h-BN powder is characterized in that the ratio of the height (a1) of the peak before treatment to the height (a2) of the peak after treatment, a2/a1, is 0.80 to 1.00 and the ratio of $D_{50}$ (d1) before treatment to $D_{50}$ (d2) after treatment, d2/d1, is 0.80 to 1.00, when the h-BN powder is ultrasonically treated under the following condition 1 for 1 minute,

[condition 1] a powder sample dispersion obtained by mixing 0.06 g of the hexagonal boron nitride powder, 0.005 g of a detergent ("Mama Lemon (registered trademark)", manufactured by Lion Corporation) and 50 g of water (20° C.) is placed in a 50 mL glass beaker having a barrel inner diameter of 40 mm and a height of 60 mm, and an end of a tip of a vibrator of an ultrasonic generator is set at a height of 1 cm from a bottom surface of a central portion of the beaker, and ultrasonic treatment is performed at an output of 150 W and an oscillation frequency of 19.5 kHz.

The h-BN powder meeting the above requirements has a moderate particle size and is high in aggregation strength of aggregates of primary particles of h-BN, and thus when the h-BN powder is used as a filler of an insulating heat dissipation material of a resin or the like, high thermal conductivity and high dielectric strength can be imparted to the insulating heat dissipation material.

(Content of Impurities in h-BN Powder)

The h-BN powder of the present invention comprises boron as an impurity element at a content of 1.00 to 30.00% by mass and oxygen as an impurity element at a content of 0 to 1.00% by mass.

The content of oxygen in the h-BN powder is 1.00% by mass or less, preferably 0.50% by mass or less, and more preferably 0.20% by mass or less. An oxygen atom can be inevitably comprised in the h-BN powder, and the content of oxygen is preferably as low as possible. The content of oxygen is low, and thus when the h-BN powder is added to a resin or the like and used, any influence on curing of a resin or the like can be suppressed.

The content of oxygen can be measured by placing a sample of the h-BN powder in a graphite crucible, fusing the sample under a helium gas atmosphere, detecting carbon monoxide or carbon dioxide produced, according to an infrared absorption method, and performing conversion into the mass of an oxygen atom. Such an oxygen atom in the sample can be bound to a carbon atom forming the crucible, and detected in the form of carbon monoxide or carbon dioxide. Specifically, the content ($q_O$) of oxygen in the h-BN powder is determined from a value obtained by measurement with a nitrogen/oxygen analyzer ("TC-600", manufactured by LECO Japan Corporation), as shown in the following Examples.

The content of boron as an impurity element in the h-BN powder, namely, a boron atom not bound to any nitrogen atom and not forming any h-BN molecule is 1.00 to 30.00% by mass, preferably 5.00 to 28.00% by mass, and more preferably 10.00 to 25.00% by mass.

When the content of boron is 1.00% by mass or more, the surface of primary particles of h-BN can be smoothed, and high thermal conductivity can be imparted in the case of addition of the h-BN powder to a resin or the like. When the content is 30.00% by mass or less, sufficient dielectric strength can be imparted in the case of addition of the h-BN powder to a resin or the like.

The content ($q_B$) of boron as an impurity element in the h-BN powder is assumed to be a value ($q-q_O$) obtained by subtracting the content ($q_O$) of oxygen from the total content (q) of impurities. The total content (q) of impurities is herein determined as follows.

First, a sample of the h-BN powder is placed in a graphite crucible and fused at 2700° C. or more under a helium gas atmosphere, in the same manner as in the measurement of the content ($q_O$) of oxygen described above, and thus nitrogen in the sample is released in the form of nitrogen gas. The nitrogen gas is detected by a thermal conductivity detector, for such measurement. Specifically, a value obtained by measurement with a nitrogen/oxygen analyzer ("TC-600", manufactured by LECO Japan Corporation) is defined as the content ($q_N$) of nitrogen in the h-BN powder, as shown in the following Examples.

The purity (p) of the h-BN powder is determined using the measurement value of the content ($q_N$) of nitrogen, a molecular weight of h-BN of 24.818 and an amount of a nitrogen (N) atom, of 14.007, according to the following formula (1), and the total content (q) of impurities is calculated according to the following formula (2).

$$p[\% \text{ by mass}] = (q_N[\% \text{ by mass}]) \times 24.818/14.007 \quad (1)$$

$$q[\% \text{ by mass}] = 100-p \quad (2)$$

(Particle Size Distribution)

FIG. 1 shows an example of particle size distribution curves representing volume-based frequency distribution of the h-BN powder of the present invention. The particle size distribution curve before ultrasonic treatment under the following condition 1 for 1 minute is on the upper side relative to a center arrow of FIG. 1, and the particle size distribution curve after the ultrasonic treatment is on the down side relative to the center arrow of FIG. 1. The particle size distribution curves in FIG. 1 are shown for an h-BN powder of Example 1 (Production Example 1) described below.

The h-BN powder of the present invention has a peak A in the particle diameter range of 10.0 μm or more and less than 100.0 μm and a $D_{50}$ (d1) of 30.0 to 200.0 μm in the particle size distribution curve representing volume-based frequency distribution, as shown in FIG. 1.

It is considered that a powder exhibiting the peak A and having a particle diameter in the range of 10.0 μm or more and less than 100.0 μm and around the range corresponds to an aggregate of primary particles of h-BN. The particle diameter at a position where the peak A appears is preferably 20.0 μm or more and less than 95.0 μm, and more preferably 20.0 μm or more and less than 90.0 μm.

When the particle diameter at the position where the peak A appears is within the particle diameter range, the h-BN powder is suitable for imparting high thermal conductivity and high dielectric strength to the resin or the like, and is also excellent in handle ability when added to the resin or the like.

The h-BN powder has a $D_{50}$ (d1) of 30.0 to 200.0 μm, preferably 40.0 to 150.0 μm, and more preferably 50.0 to 100.0 μm.

When d1 is within the above range, the h-BN powder is suitable for imparting high thermal conductivity and high dielectric strength to the resin or the like, and is also excellent in handle ability when added to the resin or the like.

The ratio of the height (a1) of the peak A before treatment to the height (a2) of the peak A after treatment, a2/a1, is 0.80 to 1.00 and the ratio of $D_{50}$ (d1) before treatment to $D_{50}$ (d2) after treatment, d2/d1, is 0.80 to 1.00, when the h-BN powder is ultrasonically treated under the condition 1 for 1 minute.

The particle size distribution curve in the present invention is measured according to a laser diffraction scattering method. The position and height of the peak A, and $D_{50}$ are specifically respective values obtained by measurement with the Microtrac (registered trademark) particle size distribution measuring apparatus according to a method described in the following Examples.

Figure 3:
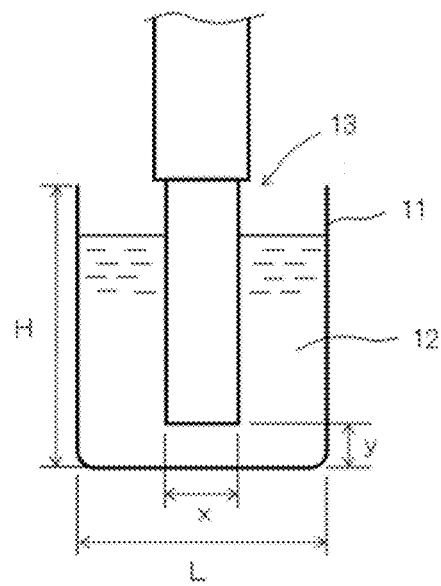
FIG. 3 schematically shows a mode of ultrasonic treatment in condition 1 according to the present invention.

FIG. 3 shows the outline of the mode of the ultrasonic treatment in the condition 1. The condition 1 is as follows: a powder sample dispersion 12 obtained by mixing 0.06 g of the h-BN powder, 0.005 g of a detergent ("Mama Lemon (registered trademark)", manufactured by Lion Corporation) and 50 g of water (20° C.) is placed in a 50 mL glass beaker 11 having a barrel inner diameter (L) of 40 mm and a height (H) of 60 mm, the end of the tip 13 of the vibrator of an ultrasonic generator (not shown) is set at a height (y) of 1 cm from the bottom surface of the central portion of the beaker 11, and ultrasonic treatment is performed at an output of 150 W and an oscillation frequency of 19.5 kHz.

As the ultrasonic generator, specifically "Ultrasonic Homogenizer US-150T" (manufactured by NIHONSEIKI KAISHA LTD.) is used, and as the tip 13 of the vibrator, one in which the portion in contact with the sample dispersion 12 is made of stainless steel and has a cylindrical shape having a diameter (x) of 18 mm is used.

It can be said that a change in the shape of the particle size distribution curve before and after the ultrasonic treatment as described above indicates a change in the aggregation state of the aggregates of primary particles of h-BN in the h-BN powder. Any aggregate having low aggregation strength among the aggregates collapses by the ultrasonic treatment. Therefore, the changes in the height of the peak A and $D_{50}$ in the particle size distribution curve before and after the ultrasonic treatment are each an indicator of the aggregation strength of the aggregates. When the height of the peak A is not changed before and after the treatment, namely, a2/a1 is 1, it can be said that the aggregates have high aggregation strength.

In the h-BN powder, a2/a1 is 0.80 to 1.00, preferably 0.85 to 1.00, and more preferably 0.90 to 1.00. When a2/a1 is 0.8 or more, it can be said that the aggregates have sufficient aggregation strength for imparting high thermal conductivity and high dielectric strength to the resin or the like.

For the peak A before treatment and the peak A after treatment, the particle diameters at the peak positions are not necessarily the same. The peak position may also shift to the smaller particle diameter side after treatment compared with before treatment.

In the h-BN powder, d2/d1 is 0.80 to 1.00, preferably 0.85 to 1.00, and more preferably 0.90 to 1.00. When a2/a1 is within the predetermined range and d2/d1 is 1, it can be said that the aggregates have very high aggregation strength.

When d2/d1 is 0.8 or more, it can be said that the aggregates have sufficient aggregation strength for imparting high thermal conductivity and high dielectric strength to the resin or the like.

(BET Specific Surface Area)

The h-BN powder preferably has a BET specific surface area of 0.1 $m^2/g$ or more and less than 5.0 $m^2/g$, more preferably 0.5 to 4.5 $m^2/g$, further preferably 1.0 to 4.0 $m^2/g$, still further preferably 1.5 to 4.0 $m^2/g$, and more preferably 3.0 to 4.0 $m^2/g$.

When the BET specific surface area is 0.1 $m^2/g$ or more, the h-BN powder is easily improved in compatibility with the resin or the like. When the BET specific surface area is less than 5.0 $m^2/g$, primary particles of h-BN have a smooth surface, and the h-BN powder is suitable for imparting high thermal conductivity and high dielectric strength to the resin or the like.

The BET specific surface area in the present invention is measured by a BET one-point method according to a flow method (adsorbate: nitrogen gas). Specifically, the BET specific surface area is a value measured using the fully automatic BET specific surface area measuring apparatus described in the following Examples.

(Surface of Primary Particles)

Figure 4:
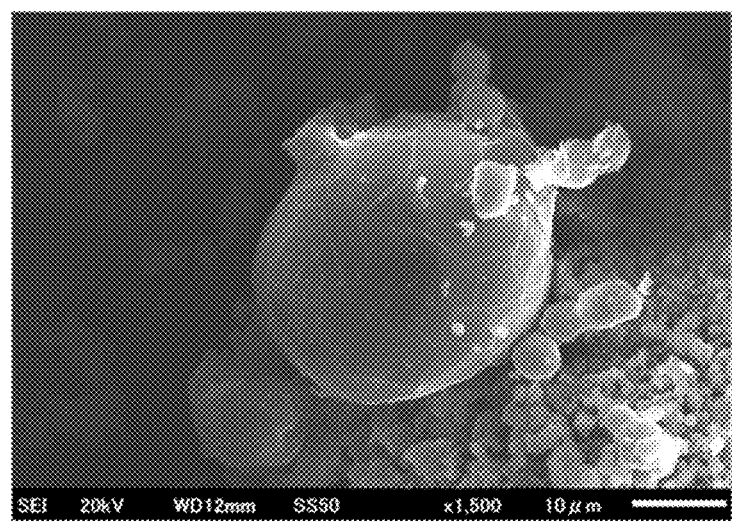
FIG. 4 is a scanning electron microscope (hereinafter abbreviated as "SEM".) image (at a magnification of 1500 times) of the surface of primary particles of h-BN in the h-BN powder of the present invention.
Figure 5:
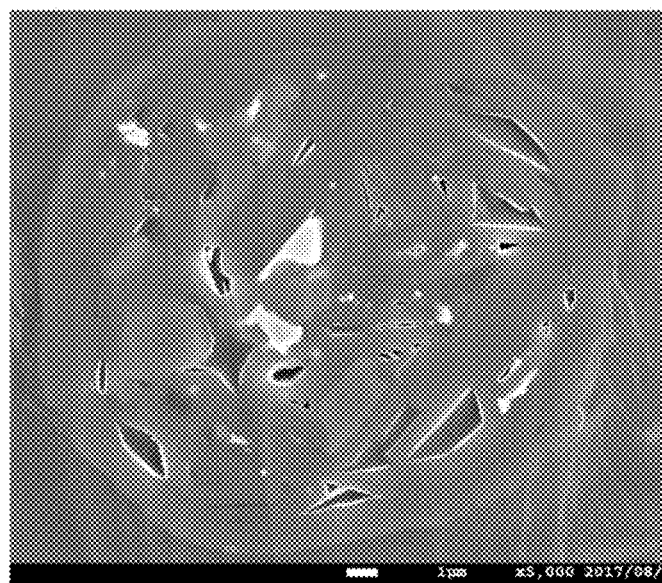
FIG. 5 is a SEM image (at a magnification of 5000 times) of the cross-section of primary particles of h-BN in the h-BN powder of the present invention.

FIG. 4 shows a SEM image of the surface of primary particles of h-BN forming the h-BN powder of the present invention. FIG. 5 shows a SEM image of the cross-section of primary particles of h-BN forming the h-BN powder of the present invention. As shown in FIG. 4 and FIG. 5, the primary particles are turtle shell shaped like particles having a small specific surface area and having a smooth surface. It is considered that the primary particles each have such a particle shape to thereby allow the powder to be suitable for imparting high thermal conductivity and high dielectric strength to the resin or the like.

(Crystallite Diameter)

The h-BN powder preferably has a crystallite diameter derived from the (002) plane of hexagonal boron nitride, as determined by powder X-ray diffraction measurement, of 250 Å or more and less than 375 Å, more preferably 275 Å or more and less than 360 Å, and further preferably 300 Å or more and less than 345 Å.

A crystallite diameter of 250 Å or more is preferable in that primary particles of h-BN have proper particle boundary and high thermal conductivity is imparted to the resin or the like. A crystallite diameter of less than 375 Å is preferable in that the sizes of primary particles of h-BN and voids between the primary particles are properly retained to thereby enable a reduction in aggregation strength of aggregates of the primary particles to be suppressed and high thermal conductivity is imparted to the resin or the like.

The crystallite diameter is a value determined from powder X-ray diffraction measurement using Scherrer's formula, and specifically determined by a method described in the following Examples.

[Method for Producing Hexagonal Boron Nitride (h-BN) Powder]

The h-BN powder of the present invention can be preferably produced, for example, by the production method of the present invention as described below, though the method for producing the same is not particularly limited.

The production method of the present invention is a production method comprising step 1 of preparing a mixed powder comprising a boron powder and one or two or more boron compounds selected from the group consisting of a boron oxoacid and boron oxide, step 2 of calcining the mixed powder under a noble gas atmosphere at 1200° C. or more and less than 1800° C. to obtain a calcined powder, step 3 of granulating the calcined powder to obtain a granulated powder having a particle diameter of 10 to 200 μm, step 4 of melting the granulated powder under a noble gas atmosphere at 1800° C. or more and less than 2000° C. to obtain a molten powder, and step 5 of firing the molten powder under a nitrogen gas atmosphere at 2000 to 2300° C. to obtain a hexagonal boron nitride powder.

The production method is performed by undergoing steps 1 to 5 in order, and the h-BN powder of the present invention, which has the moderate particle size and in which aggregates of primary particles of h-BN have high aggregation strength, can be suitably obtained by granulating a raw material powder, then melting and thereafter nitridation-firing the granulated powder, to thereby smooth the surface of primary particles of h-BN. The h-BN powder obtained by the production method has a turtle shell shaped like shape (see FIG. 4) where the surface of the primary particles has smoothness, and is suitable in that the BET specific surface area is small and high thermal conductivity and high dielectric strength are imparted to the resin or the like.

The above production method will be described below in the order of steps.

(Step 1: Mixing Step)

The step 1 is the step of preparing a mixed powder comprising a boron powder and one or two or more boron compounds selected from the group consisting of a boron oxoacid and boron oxide. From the viewpoint of producing the h-BN powder of the present invention in high yield, the amount of the boron compound in the mixed powder is preferably 50 to 300 parts by mass, more preferably 75 to 200 parts by mass, and more preferably 90 to 150 parts by mass per 100 parts by mass of the boron powder.

The mixed powder may comprise components other than the boron powder and the boron compound within a range in which the h-BN powder of the present invention can be obtained by the production method, but the total content of the boron powder and the boron compound in the mixed powder is preferably 90% by mass or more, more preferably 95% by mass or more, and further preferably 100% by mass.

<Boron Powder>

As the boron powder, for example, amorphous boron, or crystalline boron such as a β-rhombohedral crystal can be used. One of these may be used alone, or two or more of these may be used in combination.

As the boron powder, a fine powder having a $D_{50}$ of 0.1 to 5.0 µm is preferably used from the viewpoint of reactivity. $D_{50}$ of the boron powder is determined by the same measurement method as the method of measuring $D_{50}$ of the h-BN powder described above.

The boron purity of the boron powder is preferably 80% by mass or more, more preferably 90% by mass or more, and further preferably 95% by mass or more.

As the boron powder that is such a fine powder, commercial products can be used.

The mixing method of the boron powder and the boron compound in order to obtain the mixed powder is not particularly limited and can be performed using a mixing machine generally used for obtaining a mixed powder.

<Boron Compound>

Examples of the boron compound to be mixed with the boron powder include boron oxoacids such as orthoboric acid ($H_3BO_3$), metaboric acid ($HBO_2$), and tetraboric acid ($H_2B_4O_7$), and boron oxide (boric anhydride: $B_2O_3$). One of these may be used alone, or two or more of these may be used in combination. Among these, boric anhydride ($B_2O_3$) is preferred from the viewpoint of the ease of mixing with the boron powder, easy availability, and the like.

The purity of the boron compound is preferably 80% by mass or more, more preferably 85% by mass or more, and further preferably 90% by mass or more.

(Step 2: Calcining Step)

The step 2 is the step of calcining the mixed powder under a noble gas atmosphere at 1200° C. or more and less than 1800° C. to obtain a calcined powder.

Figure 6:
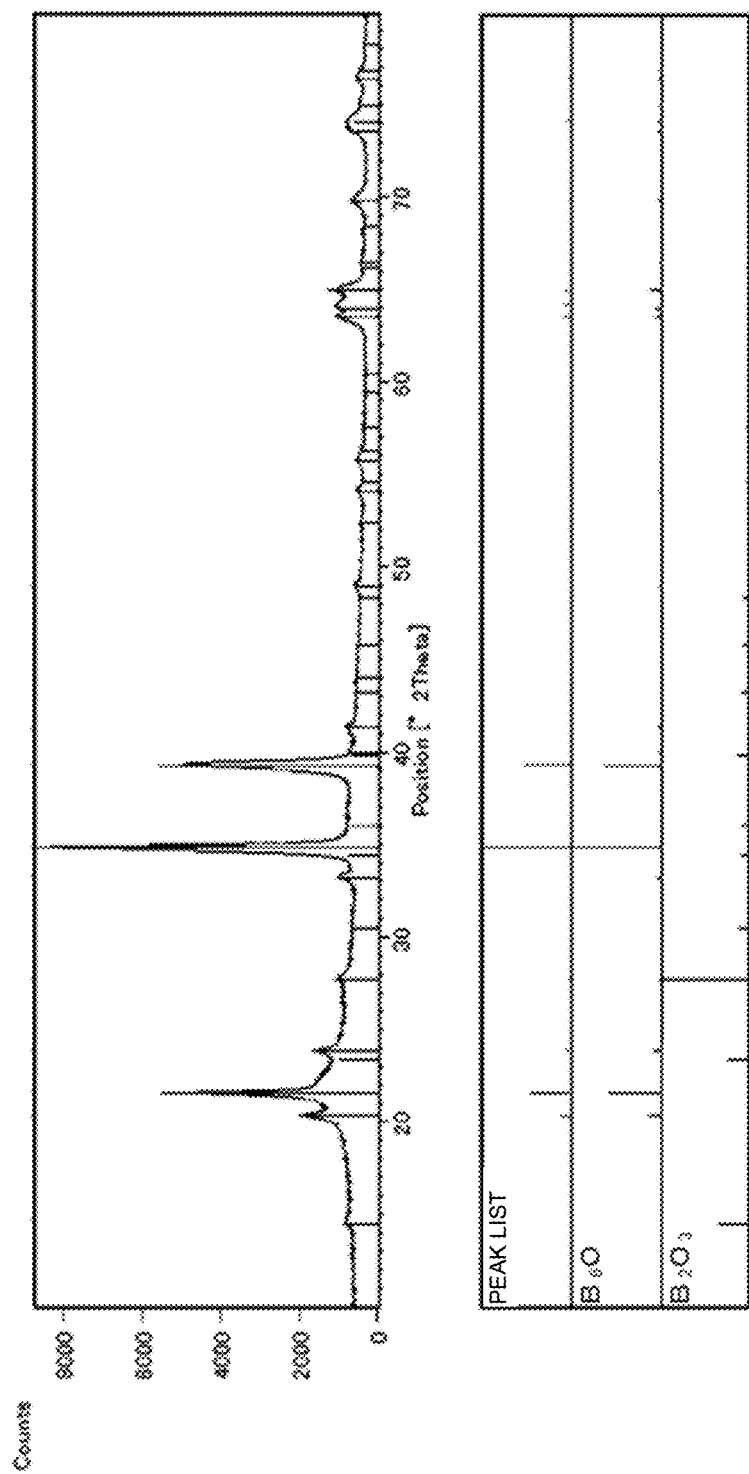
FIG. 6 shows an X-ray diffraction spectrum of a calcined powder in Production Example 1.

In the calcination, a reaction of boron and the boron compound allows the boron to be oxidized, thereby producing boron suboxide ($B_6O$). The calcined powder preferably comprises boron suboxide. Such production of boron suboxide can be confirmed by powder X-ray diffraction measurement as shown in FIG. 6 (see "Scripta Materialia", vol. 99, 2015, p. 69-72).

Figure 7:
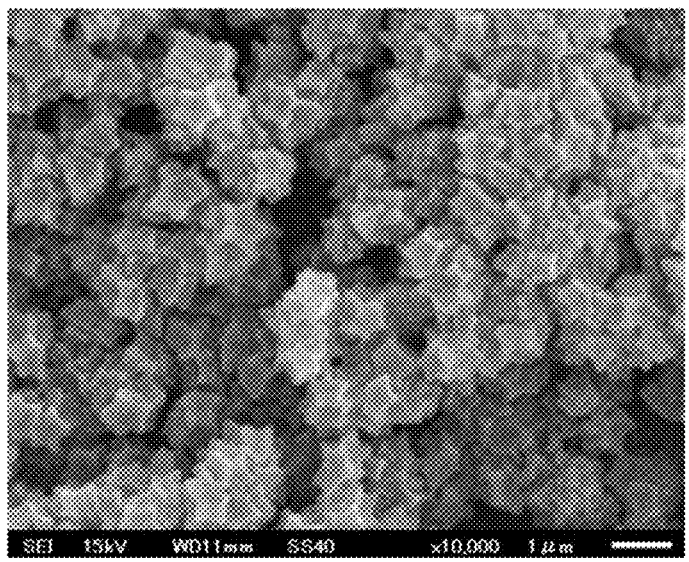
FIG. 7 is a SEM image (at a magnification of 10000 times) of the calcined powder in Production Example 1.

FIG. 7 shows a SEM image of the calcined powder. As shown in FIG. 7, the calcined powder is a particle having a pointed surface and having a star shape.

The calcination is performed under a noble gas atmosphere, preferably argon gas atmosphere, for the purpose of the progress of the reaction. The calcination atmosphere preferably comprises neither an oxygen gas, nor a nitrogen gas. The purity of an argon gas in the calcination atmosphere is preferably 90% by volume or more, more preferably 95% by volume or more, and further preferably 98% by volume or more.

The calcination temperature is 1200° C. or more and less than 1800° C. from the viewpoint of the progress of an oxidation reaction of boron, and is preferably 1350 to 1750° C., and more preferably 1500 to 1700° C. Such a temperature range is preferable because when the calcination temperature is 1200° C. or more, an oxidation reaction of boron easily progresses, and when the calcination temperature is less than 1800° C., the evaporation speed of the boron compound is decreased and any loss due to an unreacted raw material can be suppressed.

From the viewpoint of homogeneous progress of the reaction, the temperature rise in the calcination is preferably performed stepwise, and, preferably, the temperature is raised to a temperature less than 1200° C., for example, 800 to 1100° C., and thereafter raised to the calcination temperature.

The calcination time taken for performing a heat treatment at the calcination temperature is preferably 1 to 20 hours, more preferably 2 to 15 hours, and further preferably 3 to 10 hours from the viewpoint of the progress of an oxidation reaction of boron, production cost, and the like.

When the calcined powder is aggregated, such a calcined powder ground and/or classified may be subjected to step 3 from the viewpoint of the ease of granulation in a subsequent granulation step as step 3. For example, the calcined powder may be ground by a mortar or a common grinder and then classified by a sieve, to obtain particle the powder passing through the sieve, having a diameter of 100 µm or less, and the powder may be subjected to step 3.

The grinding method is not particularly limited and can be performed using, for example, a method using a mortar, or a known method using a jaw crusher, a pin mill, a roll crusher, or the like.

The classification method is also not particularly limited and can also be performed using, for example, a sieve having an opening corresponding to the desired particle size, or means such as a vibrating sieve apparatus, airflow classification, water sieve, or centrifugation.

(Step 3: Granulation Step)

The step 3 is the step of granulating the calcined powder to obtain a granulated powder having a particle diameter of 10 to 200 µm.

The granulated powder preferably has a particle diameter of 10 to 200 µm, preferably 20 to 150 µm, and more preferably 30 to 100 µm from the viewpoint of obtaining the h-BN powder of the present invention, having a predetermined particle size. When the particle diameter is 10 µm or more, an h-BN powder imparting high thermal conductivity to the resin or the like is easily obtained, and when the particle diameter is 200 µm or less, an h-BN powder having a particle size which allows formability in addition to the resin or the like to be easily maintained can be suitably obtained.

The particle diameter referred to herein is a value based on an opening of a classification sieve.

The granulation method is not particularly limited, and a method for obtaining a common granulated powder can be applied. For example, the method can be performed by a dry granulation method such as a method involving pressure-forming and then grinding the calcined powder, and classifying the resulting powder by a sieve or the like. Alternatively, the method can also be performed by a wet granulation method such as a method involving spraying and drying a liquid in which the calcined powder is dispersed.

When the granulation is performed by the dry granulation method, a pressure-forming method for obtaining a homogeneous granulated powder is preferably performed, for example, adding a binder to the calcined powder and mixing the powder and the binder, and uniaxially pressing the mixed powder placed in a die.

The binder is not particularly limited, and examples thereof include polyvinyl alcohol (PVA), cellulose, and resins such as polyvinylidene fluoride (PVDF). One of these may be used alone, or two or more of these may be used in combination. Among these, PVA is preferably used.

The amount of the binder added is preferably 0.05 to 2 parts by mass, more preferably 0.1 to 1 part by mass, and further preferably 0.15 to 0.5 parts by mass per 100 parts by mass of the calcined powder.

The binder may be added as a solution. For example, when PVA is used, preferably an aqueous solution having a concentration of 0.1 to 15% by mass, more preferably 0.5 to 10% by mass, and further preferably 1 to 5% by mass is added.

In a case where the binder in the form of an aqueous solution or the like is added, the formed body obtained by pressure-forming may be dried and then ground as needed. The drying temperature is preferably 100 to 400° C., more preferably 150 to 400° C., and further preferably 200 to 300° C. The drying time is preferably 1 to 20 hours, more preferably 2 to 15 hours, and further preferably 3 to 12 hours.

The grinding and classification of the formed body can be performed using the same methods as the grinding method and the classification method used to obtain the calcined powder, as described in the step 2. For example, a granulated powder having a particle diameter falling within the range can be obtained by grinding by a mortar or a common grinder and then classification by a sieve or the like.

When the granulation is performed, boron oxide ($B_2O_3$) or hexagonal boron nitride (h-BN) is preferably added to the calcined powder. Any one of or both such boron compounds to be added may be used.

It is considered that the boron oxide added is evaporated when heat-treated in a subsequent step, and allows voids to be generated in the resulting granulated powder and results in an increase in surface area to thereby enable a nitridation reaction for producing h-BN to be promoted.

The amount of the boron oxide added is preferably 1 to 200 parts by mass, more preferably 10 to 100 parts by mass, and further preferably 30 to 70 parts by mass per 100 parts by mass of the calcined powder from the viewpoint of the effect of the promotion of the nitridation reaction and the yield of the h-BN powder.

In a case where h-BN is added, the h-BN serves as a nucleus of the granulated powder and results in an enhancement in yield of the granulated powder and the effect of the promotion of a nitridation reaction in a nitridation-firing step as step 5 described below. The h-BN added is preferably a primary particle or a particle aggregated, having a $D_{50}$ of 0.1 to 100 μm, from the viewpoint of mixing ability with the calcined powder and the ease of granulation. The nucleus of the granulated powder is more preferably such a particle aggregated.

The amount of the h-BN added is preferably 10 to 300 parts by mass, more preferably 20 to 200 parts by mass, and further preferably 30 to 100 parts by mass per 100 parts by mass of the calcined powder from the viewpoint of the effect of the promotion of the nitridation reaction and the yield of the h-BN powder of the present invention.

(Step 4: Melting Step)

The step 4 is the step of melting the granulated powder under a noble gas atmosphere at 1800 to 2300° C. to obtain a molten powder.

The melting is a heat treatment for melting and smoothing the surface of the granulated powder comprising boron suboxide (melting point: about 2000° C.). The smoothing of the surface of the molten powder can be confirmed by a SEM image, as shown in the following Examples.

Figure 8:
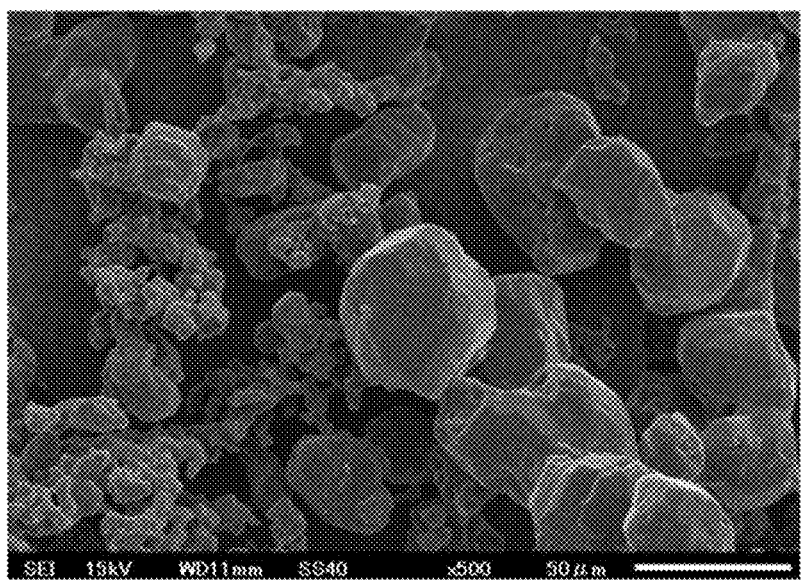
FIG. 8 is a SEM image (at a magnification of 500 times) of a molten powder in Production Example 1.

FIG. 8 shows a SEM image of the molten powder. As shown in FIG. 8, the molten powder is a particle having a surface molten and smoothed.

The molten powder preferably have a BET specific surface area of 2.0 $m^2/g$ or less, more preferably 1.5 $m^2/g$ or less, and further preferably 1.2 $m^2/g$ or less from the viewpoint that an h-BN powder having a BET specific surface area of less than 5 $m^2/g$ is obtained.

The heat treatment is performed under a noble gas atmosphere and is preferably performed under an argon gas atmosphere. The heat treatment atmosphere preferably comprises neither an oxygen gas, nor a nitrogen gas. The argon gas of the heat treatment atmosphere preferably has a purity of 90% by volume or more, more preferably 95% by volume or more, and further preferably 98% by volume or more.

The heat treatment temperature is 1800 to 2300° C., preferably 1850 to 2200° C., and more preferably 1900 to 2100° C. from the viewpoint of melting and smoothing of the surface of the granulated powder. When the temperature is 1800° C. or more, the surface of the granulated powder can be molten, and when the temperature is 2300° C. or less, the granulated powder is inhibited from being molten and bonded.

The heat treatment time is preferably 1 to 10 hours, more preferably 1.5 to 8 hours, and further preferably 2 to 5 hours from the viewpoint of the progress of melting and smoothing of the surface of the granulated powder, production cost, and the like.

(Step 5: Nitridation-Firing Step)

The step 5 is the step of firing the molten powder under a nitrogen gas atmosphere at 2000 to 2300° C. to obtain an h-BN powder. That is, an h-BN powder is obtained as a nitridation-fired powder, in the step.

The nitridation-firing is performed under a nitrogen gas atmosphere for the purpose of a nitridation reaction of boron oxide of the molten powder. The nitridation-firing atmosphere may comprise a noble gas, but preferably comprises no oxygen gas. The nitrogen gas in the nitridation-firing atmosphere preferably has a purity of 90% by volume or more, more preferably 95% by volume or more, and further preferably 98% by volume or more.

The firing temperature is 2000 to 2300° C., preferably 2050 to 2250° C., and more preferably 2100 to 2200° C. from the viewpoint of the progress of the nitridation reaction, the inhibition of the decomposition of h-BN, and the like. The temperature is preferably 2000° C. or more because the nitridation reaction of boron oxide easily progresses, and the temperature is preferably 2300° C. or less because the decomposition of h-BN is inhibited.

The firing time is preferably 4 to 48 hours, more preferably 6 to 42 hours, and further preferably 8 to 36 hours from the viewpoint of the progress of the nitridation reaction, the inhibition of the decomposition of h-BN, production cost, and the like. In a case where at least any of boron oxide and hexagonal boron nitride is added to the calcined powder, for granulation, in the step 3 (granulation step), the h-BN powder can be obtained in a shorter firing time by the effect of the promotion of the nitridation reaction, as described above.

The nitridation-fired powder may be ground and/or classified, and thus obtained as an h-BN powder having a predetermined particle size. The grinding method and the classification method are not particularly limited, and can be performed by the same methods as the grinding method and the classification method used to obtain the calcined powder, as described in the step 2. For example, an h-BN powder having a predetermined particle size can be obtained by grinding by a mortar or a common grinder and then classification by a sieve or the like.

The nitridation-fired powder preferably has a particle diameter of 10 to 200 μm, more preferably 20 to 150 μm, and further preferably 30 to 100 μm. The particle diameter referred to herein is a value based on an opening of a classification sieve.

[Composition]

The composition of the present invention comprises a base material comprising one or two or more selected from the group consisting of a resin and a rubber, and the h-BN powder.

In the composition, the h-BN powder is blended with the base material as a filler for increasing thermal conductivity and insulation properties. The h-BN powder is easily compatible with the base material, and thus a homogeneous composition can be formed which is suitable for imparting high thermal conductivity and high dielectric strength to the resin or the like.

A content of the h-BN powder in the composition is preferably 10 to 90% by volume, more preferably 20 to 80% by volume, and further preferably 30 to 70% by volume from the viewpoint of performance as the filler, compatibility with the base material, and the like.

A content of 10% by volume or more is preferable in that high thermal conductivity is imparted to the resin or the like. A content of 90% by volume or less is preferable in that voids are hardly generated in the composition and high dielectric strength is imparted to the resin or the like.

The volume content of the h-BN powder in the composition is calculated by dividing by the density of boron nitride the mass content of the h-BN powder measured by the combustion method described in JIS K 7075: 1991 "Testing methods for carbon fiber content and void content of carbon fiber reinforced plastics". For the total volume of the composition, the value calculated from the specific gravities of boron nitride and the base material is used.

(Base Material)

Examples of the base material of the composition of the present invention include a resin or rubber. One of these may be used alone, or two or more of these may be used in combination.

The content of the base material in the composition is preferably within a range in which the h-BN powder to be added and mixed imparts high thermal conductivity and high dielectric strength to the resin or the like, and is preferably 10 to 90% by volume, more preferably 20 to 80% by volume, and further preferably 30 to 70% by volume.

The volume content of the base material in the composition is obtained from the total volume calculated from the specific gravities of boron nitride and the base material, and the volume content of the h-BN powder.

Examples of the resins include thermosetting resins, thermoplastic resins, thermoplastic elastomers, and oils.

Examples of the thermosetting resins include epoxy resins, silicone resins, phenolic resins, urea resins, unsaturated polyester resins, melamine resins, polyimide resins, polybenzoxazole resins, and urethane resins.

Examples of the thermoplastic resins include polyolefin resins such as polyethylene, polypropylene, and ethylene-vinyl acetate copolymers; polyester resins such as polyethylene terephthalate, polybutylene terephthalate, and liquid crystal polyesters; polyvinyl chloride resins, acrylic resins, polyphenylene sulfide resins, polyphenylene ether resins, polyamide resins, polyamide-imide resins, and polycarbonate resins.

Examples of the thermoplastic elastomers include olefin-based thermoplastic elastomers, styrene-based thermoplastic elastomers, vinyl chloride-based thermoplastic elastomers, urethane-based thermoplastic elastomers, and ester-based thermoplastic elastomers.

Examples of the oils include greases such as silicone oils.

Examples of the rubbers include natural rubbers, polyisoprene rubbers, styrene-butadiene rubbers, polybutadiene rubbers, ethylene-propylene rubbers, ethylene-propylene-diene rubbers, butadiene-acrylonitrile rubbers, isobutylene-isoprene rubbers, chloroprene rubbers, silicone rubbers, fluororubbers, chloro-sulfonated polyethylene, and polyurethane rubbers. These rubbers are preferably crosslinked.

The base material is appropriately selected according to characteristics such as mechanical strength, heat resistance, durability, softness, and flexibility required in the application uses of a heat dissipation material obtained using the composition of the present invention. As the base material, thermosetting resins are preferred. Among these, epoxy resins and silicone resins are preferably used, and epoxy resins are more preferred.

<Epoxy Resin>

As the epoxy resin used for the base material, for example, epoxy resins that are liquid at ordinary temperature (25° C.), and low softening point epoxy resins that are solid at ordinary temperature (25° C.) are preferred, from the viewpoint of the ease of mixing and the like of the h-BN powder in the base material.

Such an epoxy resin should be a compound having two or more epoxy groups in one molecule. Examples thereof include bisphenol A type epoxy resins, bisphenol F type epoxy resins, glycidyl ethers of polycarboxylic acids, and epoxy resins obtained by the epoxidation of cyclohexane derivatives. One of these may be used alone, or two or more of these may be used in combination. Among these, bisphenol A type epoxy resins, bisphenol F type epoxy resins, and epoxy resins obtained by the epoxidation of cyclohexane derivatives are preferred from the viewpoint of heat resistance, the ease of handling, and the like.

From the viewpoint of the inhibition of the segregation of the h-BN powder in the base material, the mechanical characteristics, such as toughness, of a heat dissipation material obtained from the composition, and the like, a thermoplastic resin soluble in the epoxy resin is preferably further blended.

As such a thermoplastic resin, a thermoplastic resin having a hydrogen-bonding functional group is preferred. Examples of the functional group include an alcoholic hydroxyl group, an amide bond, a sulfonyl group, and a carboxyl group. Specific examples of the thermoplastic resin include thermoplastic resins having an alcoholic hydroxyl group such as polyvinyl acetal resins such as polyvinyl formal and polyvinyl butyral, polyvinyl alcohol, and phenoxy resins; thermoplastic resins having an amide bond such as polyamides, polyimides, polyamide-imides, and polyvinylpyrrolidone; thermoplastic resins having a sulfonyl group such as polysulfones; and thermoplastic resins having a carboxyl group such as polyesters, polyamides, and polyamide-imides. Among these, thermoplastic resins having an alcoholic hydroxyl group are preferred, and phenoxy resins are more preferred.

The amount of the thermoplastic resin having the hydrogen-bonding functional group blended is preferably 0.05 to 50 parts by mass, more preferably 1.0 to 30 parts by mass, and further preferably 5 to 25 parts by mass per 100 parts by mass of the total of the epoxy resin, and a curing agent and a curing accelerator used as needed.

In order to cure the epoxy resin, a curing agent for the epoxy resin can be used as needed. The curing agent is not particularly limited, and a known one can be appropriately selected and used. Examples of the curing agent include amine-based, phenol-based, acid anhydride-based, and imidazole-based curing agents. One of these may be used alone, or two or more of these may be used in combination.

Examples of the amine-based curing agents include dicyandiamide and aromatic diamines such as m-phenylenediamine, 4,4'-diaminodiphenylmethane, 4, 4'-diaminodiphenyl sulfone, and m-xylylenediamine.

Examples of the phenol-based curing agents include phenol novolac resins, cresol novolac resins, bisphenol A type novolac resins, and triazine-modified phenol novolac resins.

Examples of the acid anhydride-based curing agents include alicyclic acid anhydrides such as methylhexahydrophthalic anhydride, aromatic acid anhydrides such as phthalic anhydride, aliphatic acid anhydrides such as aliphatic dibasic acid anhydrides, and halogen-based acid anhydrides such as chlorendic anhydrides.

Examples of the imidazole-based curing agents include 2-methylimidazole, 2-undecylimidazole, 2-heptadecylimidazole, 2-ethyl-4-methylimidazole, 2-phenylimidazole, 2-phenyl-4-methylimidazole, and 1-cyanoethyl-2-ethyl-4-methylimidazole.

The amount of the curing agent used is usually about 0.5 to 1.5 equivalents, preferably 0.7 to 1.3 equivalents, based on the epoxy resin in terms of the balance of curability and cured resin physical properties, and the like.

The epoxy resin can be used in combination with a curing accelerator for the epoxy resin together with the curing agent as needed. The curing accelerator is not particularly limited, and a known one can be appropriately selected and used. Examples of the curing accelerator include imidazole compounds such as 2-ethyl-4-methylimidazole, 1-benzyl-2-methylimidazole, 2-methylimidazole, 2-ethylimidazole, 2-isopropylimidazole, 2-phenylimidazole, and 2-phenyl-4-methylimidazole; 2,4,6-tris(dimethylaminomethyl)phenol; boron trifluoride-amine complexes; and triphenylphosphine. One of these may be used alone, or two or more of these may be used in combination.

The amount of the curing accelerator used is usually about 0.1 to 10 parts by mass, preferably 0.4 to 5 parts by mass, per 100 parts by mass of the epoxy resin in terms of the balance of curability and cured resin physical properties, and the like.

<Silicone Resin>

As the silicone resin, a mixture of an addition reaction type silicone resin and a silicone-based crosslinking agent can be used.

Examples of the addition reaction type silicone resin include polyorganosiloxanes having an alkenyl group as a functional group. Specific examples of the polyorganosiloxanes include polydimethylsiloxane having a vinyl group as a functional group, polydimethylsiloxane having a hexenyl group as a functional group, and mixtures thereof.

Examples of the silicone-based crosslinking agent include polyorganosiloxanes having two or more silicon atom-bonded hydrogen atoms in one molecule. Specific examples include dimethylhydrogensiloxy group end-capped dimethylsiloxane-methylhydrogensiloxane copolymers, trimethylsiloxy group end-capped dimethylsiloxane-methylhydrogensiloxane copolymers, trimethylsiloxane group end-capped poly(methylhydrogensiloxane), and poly(hydrogen silsesquioxane).

Examples of the curing catalyst for obtaining the silicone resin include platinum-based catalysts such as particulate platinum, particulate platinum adsorbed on carbon powder supports, chloroplatinic acid, alcohol-modified chloroplatinic acid, and olefin complexes of chloroplatinic acid; palladium catalysts; and rhodium catalysts. Among these, usually platinum-based catalysts are used.

(Other Components)

The composition may contain other components other than the base material and the h-BN powder within a range in which the effects of the present invention are not impaired, but the total content of the base material and the h-BN powder in the composition is preferably 90% by mass or more, more preferably 95% by mass or more, and further preferably 100% by mass.

Examples of the other components include nitride particles such as aluminum nitride, silicon nitride, and fibrous boron nitride; insulating metal oxides such as alumina, fibrous alumina, zinc oxide, magnesium oxide, beryllium oxide, and titanium oxide; insulating carbon components such as diamond and fullerenes; inorganic fillers such as aluminum hydroxide and magnesium hydroxide; surface-treating agents such as silane coupling agents for improving adhesive strength at the interface between the inorganic filler and the resin, reducing agents, plasticizers, pressure-sensitive adhesives, reinforcing agents, colorants, heat resistance-improving agents, viscosity-adjusting agents, dispersion stabilizers, and solvents.

(Production of Composition)

The composition of the present invention can be produced, for example, as follows when a resin is used as the base material, though the method for producing the same is not particularly limited.

First, as the base material, a resin, and a curing agent, a solvent, and the like added as needed are mixed, and the h-BN powder is added and mixed with the mixture so as to provide the desired volume content, thereby obtaining a composition.

The mixing method is not particularly limited and can be performed using a known method and mixing machine according to the application use of the composition.

[Heat Dissipation Material]

The heat dissipation material of the present invention comprises the composition. The heat dissipation material can be obtained as one having excellent thermal conductivity and insulation properties because the h-BN powder of the present invention described above is used as a filler.

Examples of the heat dissipation material include heat dissipation materials having various properties such as sheets, gels, greases, adhesives, and phase change sheets, and its shape is not particularly limited either. Among these, for example, heat dissipation sheets efficiently transfer heat produced from electronic components such as microprocessors (MPUs), power transistors, and transformers to heat dissipation components such as heat dissipation fins and heat dissipation fans. The heat dissipation material has excellent thermal conductivity and insulation properties and therefore can be preferably applied to such uses.

The heat dissipation sheet is obtained by forming the composition into a sheet shape. When the base material of the composition is a curable resin or the like, the heat dissipation sheet is obtained by forming and curing.

The heat dissipation sheet, for example, can be formed by coating a releasable film such as a release layer-attached resin film with the composition using a coating machine or the like, and drying the composition using a far-infrared radiation heater, warm air blowing, or the like when the composition comprises a solvent. As the release layer, for example, a melamine resin is used. As the resin film, for example, a polyester resin such as polyethylene terephthalate is used.

When the base material of the composition is not cured unlike a curable resin or the like, a sheet-shaped formed material is the heat dissipation sheet.

When the base material of the composition is a curable resin or the like, the heat dissipation sheet is obtained by pressurizing and heating the sheet-shaped formed material from the surface of the releasable film opposite to the coated surface via the releasable film according to the curing conditions of the curable resin, and the like to cure the formed material, and then peeling the releasable film.

The ratio of the diffraction peak intensity (I(002)) of the (002) plane to the diffraction peak intensity (I(100)) of the (100) plane, (I(002)/I(100)), with respect to primary particles of h-BN, as determined in the direction perpendicular to the thickness direction of the heat dissipation sheet by X-ray diffraction measurement, is preferably 7.0 to 15.0.

The thickness direction is a (002) plane direction, namely, a c-axis direction and the in-plane direction is a (100) plane direction, namely, an a-axis direction, in the h-BN crystal. In a case where primary particles of h-BN are not oriented, the I(002)/I(100) is about 6.7 (crystal density value [Dx] in "JCPDS powder X-ray diffraction database" No. 34-0421 [BN]). The I(002)/I(100) of highly crystalline h-BN is generally more than 20.

As the I(002)/I(100) is larger, the plane direction (a-axis direction) of primary particles of h-BN is more oriented to the in-plane direction of the heat dissipation sheet, and the thermal conductivity in the thickness direction of the heat dissipation sheet is easily lower. On the contrary, as the I(002)/I(100) is smaller, primary particles of h-BN are more randomly oriented in the heat dissipation sheet, and the thermal conductivity in the thickness direction of the heat dissipation sheet is easily higher. Thus, the I(002)/I(100) indicates orientation properties of primary particles of h-BN and also serves as one indicator of the thermal conductivity.

The I(002)/I(100) is actually 7.0 or more, and is preferably 15.0 or less, more preferably 12.0 or less, and further preferably 9.5 or less from the viewpoint that the heat dissipation sheet achieves high thermal conductivity.

Other auxiliary members having a sheet shape, a fibrous shape, a mesh shape, or the like can also be laminated or embedded in at least one surface of the heat dissipation sheet and the sheet interior for the purpose of the improvement of workability, reinforcement, and the like. From the viewpoint of convenience during use, and the like, a tacky layer may be provided on at least one surface of the heat dissipation sheet.

EXAMPLES

The present invention will be specifically described below by means of Examples, but the present invention is not limited to the following Examples.

[Various Analysis Evaluations in Production of h-BN Powder]

Various analysis evaluation methods of an h-BN powder and a powder sample in a production process in each of the following Production Examples are shown below.

(Content of Impurities in h-BN Powder)

The content of oxygen and the content of nitrogen in the h-BN powder sample were measured using a nitrogen/oxygen analyzer ("TC-600", manufactured by LECO Japan Corporation). The total content of impurities in the h-BN powder sample was calculated from the content of nitrogen, as described above, the content of oxygen was subtracted therefrom to provide a value, and the value was defined as the content of boron as an impurity element.

($D_{50}$ of Boron Powder and h-BN Powder)

A powder sample dispersion was prepared by mixing 0.06 g of each powder sample, 0.005 g of a detergent ("Mama Lemon (registered trademark)", manufactured by Lion Corporation) and 50 g of water (20° C.). While the dispersion was stirred at 400 rpm using a magnetic stirrer, the particle size distribution was measured with a Microtrac (registered trademark) particle size distribution measuring apparatus ("MT3300EXII", manufactured by NIKKISO CO., LTD.) to obtain $D_{50}$.

(a2/a1 and d2/d1 of h-BN Powder)

As in the above case where $D_{50}$ was obtained with respect to an h-BN powder sample, a sample dispersion of an h-BN powder was prepared, and the particle size distribution was measured to obtain the particle size distribution curve. In the particle size distribution curve, the height a1 of a peak A and $D_{50}$ (d1) in the particle diameter range of 10.0 μm or more and less than 100.0 μm were obtained.

A sample dispersion of an h-BN powder prepared in the same manner as in the sample dispersion was placed in a 50 mL glass beaker having a barrel inner diameter (L) of 40 mm and a height (H) of 60 mm, and ultrasonically treated by an ultrasonic generator ("Ultrasonic Homogenizer US-150T", manufactured by NIHONSEIKI KAISHA LTD., output 150 W, oscillation frequency 19.5 kHz) for 1 minute. The ultrasonic treatment was performed by setting the end of the tip (made of stainless steel, a cylindrical shape having a diameter (x) of 18 mm) 13 of the vibrator of the ultrasonic generator at a height (y) of 1 cm from the bottom surface of the central portion of the beaker as shown in FIG. 3.

For the sample dispersion after the ultrasonic treatment, the particle size distribution was measured in the same manner as above to obtain the particle size distribution curve. In the particle size distribution curve, the height a2 of a peak A and $D_{50}$ (d2) were determined, and a2/a1 and d2/d1 were calculated.

Figure 2:
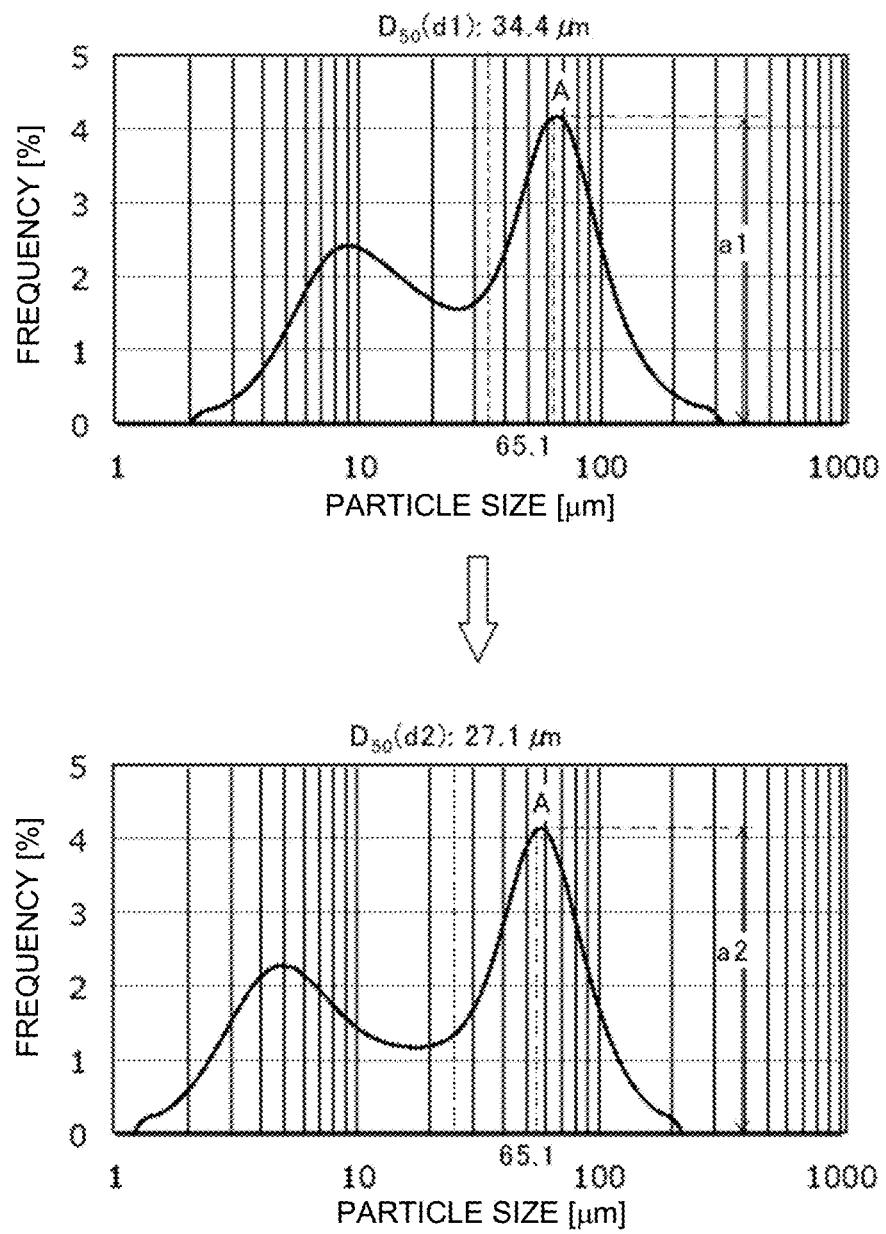
FIG. 2 shows the change in particle size distribution curve according to ultrasonic treatment of an h-BN powder of Comparative Example 2. The particle size distribution curve before the ultrasonic treatment is on the left side, and the particle size distribution curve after the ultrasonic treatment is on the right side.

As typical examples of particle size distribution curves for h-BN powders obtained in the following Production Examples, the particle size distribution curve of the h-BN powder of Production Example 1 is shown in FIG. 1 and the particle size distribution curve of the h-BN powder of Production Example 3 is shown in FIG. 2. In each of the Figs., the particle size distribution curve before the ultrasonic treatment is on the left side, and the particle size distribution curve after the ultrasonic treatment is on the right side.

(BET Specific Surface Areas of h-BN Powder and Molten Powder)

The specific surface area of the powder sample was measured by a BET one-point method according to a flow method (adsorbate: nitrogen gas) with the fully automatic BET specific surface area measuring apparatus ("Multisorb 16", manufactured by YUASA IONICS).

(Crystallite Diameter of h-BN Powder)

For an h-BN powder sample, powder X-ray diffraction measurement was performed by an X-ray diffraction measuring apparatus ("X'Pert PRO", manufactured by PANalytical, target: copper, Cu-Kα1 rays), and the crystallite diameter D [Å] was calculated from Scherrer's formula represented by the following formula (3):

$$D=(K\cdot\lambda)/(\beta\cdot\cos\theta) \qquad (3)$$

wherein K: the Scherrer constant, λ: the X-ray (Cu-Kα1 ray) wavelength [Å], β: the breadth of the diffraction line (peak half width) [radians], and θ: the Bragg angle [radians].

In the calculation, K=0.9 and λ=1.54059[Å] were set. For β, the value obtained by the correction formula represented by the following formula (4) was used.

$$\beta = (\beta_0^2 - \beta_i^2)^{0.5} \quad (4)$$

wherein $\beta_0$: the peak half-width derived from the h-BN (002) plane, and $\beta_i$: the half-width derived from the apparatus with a standard sample (Si).

(X-Ray Diffraction Measurement of Calcined Powder)

For a calcined powder sample, powder X-ray diffraction measurement was performed by the X-ray diffraction measuring apparatus used for measurement of the crystallite diameter of the h-BN powder, and it was confirmed that boron suboxide was generated.

Production of h-BN Powder

Production Example 1 (Example 1)

<Step 1: Mixing Step>

100 parts by mass of boron oxide (manufactured by KANTO CHEMICAL CO., INC., extra pure, purity more than 90% by mass) was added to 100 parts by mass of amorphous boron (manufactured by H. C. Starck GmbH, grade I, $D_{50}$: 0.6 μm, purity 95% by mass or more), and the resultant was mixed by a mixer to prepare a mixed powder.

<Step 2: Calcining Step>

The mixed powder obtained in the step 1 was placed in a graphite crucible, and calcined by raising the temperature in an atmosphere furnace from room temperature to 1000° C. over 15 minutes, then raising the temperature from 1000° C. to 1600° C. over 45 minutes and keeping the temperature at 1600° C. for 6 hours in the furnace under an argon gas (purity 99.99% by volume, flow rate 2 L/min), to thereby obtain a calcined powder.

The calcined powder was ground by a mortar, and then classified using a sieve having an opening of 75 μm by a Ro-Tap type sieve shaker by treatment for 5 minutes, to obtain the powder passing through the sieve.

The calcined powder obtained by classification was subjected to X-ray diffraction measurement. FIG. 6 shows an X-ray diffraction spectrum of the powder. As shown in FIG. 6, production of boron suboxide was confirmed.

FIG. 7 shows a SEM image of the calcined powder obtained by classification. As shown in FIG. 7, the calcined powder was observed to be a particle having a pointed surface and having a star shape.

<Step 3: Granulation Step>

10 parts by mass of an aqueous solution of 2.5% by mass PVA ("POVAL (registered trademark) PVA-205", manufactured by KURARAY CO., LTD.) as a binder per 100 parts by mass of the calcined powder (the powder passing through the sieve) obtained in the step 2 was added and mixed by a mixer.

The calcined powder mixed with the binder was uniaxially pressed at 60 MPa by a hand press apparatus, and then dried at 200° C. for about 3 hours.

The formed material dried was ground by a mortar, and then classified using sieves having openings of 75 μm and 32 μm stacked, with a Ro-Tap type sieve shaker by treatment for 5 minutes, to obtain a powder as a granulated powder on the sieve having an opening of 32 μm.

<Step 4: Melting Step>

The granulated powder obtained in the step 3 was molten by raising the temperature in an atmosphere furnace from room temperature to 1980° C. over 120 minutes and keeping the temperature at 1980° C. for 3 hours in the furnace under an argon gas (purity 99.99% by volume, flow rate 2 L/min) atmosphere, to thereby obtain a molten powder.

FIG. 8 shows a SEM image of the molten powder. As shown in FIG. 8, the molten powder was confirmed to be a particle having a surface molten and smoothed.

The molten powder had a BET specific surface area of 0.5 $m^2/g$.

<Step 5: Nitridation-Firing Step>

The atmosphere gas in the atmosphere furnace where the step 4 was performed, was replaced with nitrogen gas (purity 99.995% by volume, flow rate 2 L/min), and the molten powder was nitridation-fired by raising the temperature in the furnace to 2100° C. and keeping the temperature in the furnace for 36 hours, to thereby obtain a nitridation-fired powder.

The nitridation-fired powder was ground by a mortar and then classified using a sieve having an opening of 75 μm with a Ro-Tap type sieve shaker by treatment for 5 minutes, to obtain the powder passing through the sieve as an h-BN powder of Example 1.

Figure 9:
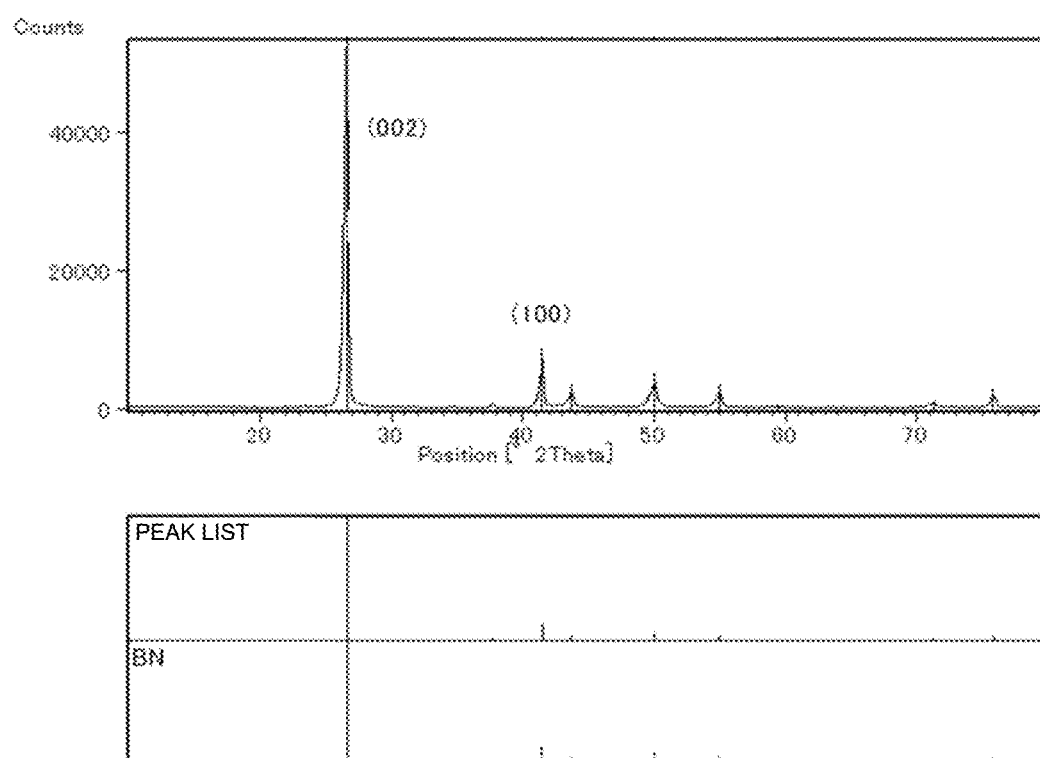
FIG. 9 shows an X-ray diffraction spectrum of the h-BN powder of Example 1.

The h-BN powder obtained by classification was subjected to X-ray diffraction measurement. FIG. 9 shows an X-ray diffraction spectrum.

Production Example 2 (Comparative Example 1)

An h-BN powder of Comparative Example 1 was obtained in the same manner as in Production Example 1 except that the temperature in the furnace was 1980° C. and the heat treatment time was 3 hours in the step 5 (nitridation-firing step) of Production Example 1 described above.

Production Example 3 (Comparative Example 2)

35 parts by mass of boron oxide (manufactured by KANTO CHEMICAL CO., INC., extra pure, purity more than 90% by mass) was added to 65 parts by mass of an h-BN powder raw material ($D_{50}$: 0.67 μm, BET specific surface area 10 $m^2/g$, crystallite diameter 260 Å), and the resultant was mixed by a mixer. 13 parts by mass of boron carbide (manufactured by RIKEN CORUNDUM CO., LTD., $D_{50}$: 3 μm) and 10 parts by mass of an aqueous solution of 2.5% by mass PVA ("POVAL (registered trademark) PVA-205", manufactured by KURARAY CO., LTD.) were added thereto and mixed by a mixer to obtain a mixed powder.

The mixed powder was uniaxially pressed at 60 MPa by a hand press apparatus, and then dried at 200° C. for about 3 hours.

The formed material dried was fired in an atmosphere furnace under a nitrogen gas (purity 99.995% by volume, flow rate 2 L/min) atmosphere at 2000° C. for 12 hours to obtain a fired material.

The resulting fired material was ground by a mortar, and then classified using a sieve having an opening of 75 μm with a Ro-Tap type sieve shaker by treatment for 5 minutes, to obtain the powder passing through the sieve as an h-BN powder of Comparative Example 2.

Production Example 4 (Comparative Example 3)

An h-BN sintered body (density 1.92 $g/cm^3$, purity 99.5% by mass or more) as a commercial product was ground by a mortar, and then classified using a sieve having an opening of 75 μm with a Ro-Tap type sieve shaker by treatment for 5 minutes, to obtain the powder passing through the sieve as an h-BN powder of Comparative Example 3.

Production Example 5 (Example 2)

An h-BN powder of Example 2 was obtained in the same manner as in Production Example 1 except that 10 parts by mass of an aqueous solution of 2.5% by mass PVA ("POVAL (registered trademark) PVA-205", manufactured by KURARAY CO., LTD.) as a binder and 38 parts by mass of the h-BN powder obtained in Production Example 4, per 100 parts by mass of the calcined powder (the powder passing through the sieve), were added and mixed by a mixer in the step 3 (granulation step) of Production Example 1 described above.

The molten powder had a BET specific surface area of 1.0 m$^2$/g.

Production of Heat Dissipation Sheets

Examples 3 and 4, and Comparative Examples 4 to 6

Compositions were made as follows using the h-BN powders produced in the above Production Examples, and further, heat dissipation sheets were produced using the compositions.

A mixture of 90 parts by mass of a bisphenol A type epoxy resin that was liquid at room temperature (25° C.) ("YD-128", manufactured by NIPPON STEEL & SUMIKIN CHEMICAL CO., LTD., epoxy equivalent 184 to 194 g/eq) and 10 parts by mass of a phenoxy resin ("YP-50S", manufactured by NIPPON STEEL & SUMIKIN CHEMICAL CO., LTD., purity 99.0% by mass or more) was used as a base material. An h-BN powder was added and mixed with the base material so that the content of the h-BN powder in the composition was 65% by volume. 153 Parts by mass of methoxypropanol ("Hisolve MP", manufactured by TOHO CHEMICAL INDUSTRY Co., Ltd.) (170 parts by mass per 100 parts by mass of the bisphenol A type epoxy resin) as a viscosity-adjusting agent was added, and the mixture was stirred and mixed using a stirring-defoaming apparatus ("MAZERUSTAR (registered trademark)", manufactured by KURABO INDUSTRIES LTD.) to make the composition. The volume content of the h-BN powder was obtained from the specific gravity of h-BN powder, 2.27 g/cm$^3$, and the specific gravity of the bisphenol A type epoxy resin, 1.17 g/cm$^3$.

A releasable film made of polyethylene terephthalate was coated with the composition with a film thickness of 350 μm using a coater and dried at 50° C. in the air for 10 minutes and further under vacuum for 10 minutes to obtain a sheet-shaped formed body.

Two of the sheet-shaped formed bodies were superimposed so that the formed bodies were in contact with each other, and then roll-pressurized to set the total thickness of the sheet-shaped formed bodies at 200 μm. Then, the sheet-shaped formed bodies superimposed were hot-pressed at 120° C. for 30 minutes for curing to produce a heat dissipation sheet 10 cm long, 10 cm wide, and 300 μm thick.

[Evaluation of Heat Dissipation Sheet]

The respective heat dissipation sheets produced in the above Examples were subjected to the following various evaluations.

(I(002)/I(100) with Respect to Primary Particles of h-BN)

For the heat dissipation sheet, the ratio of the diffraction peak intensity (I(002)) of the (002) plane to the diffraction peak intensity (I(100)) of the (100) plane, I(002)/I(100), in the direction perpendicular to the thickness direction of the heat dissipation sheet was measured by an X-ray diffraction measuring apparatus ("X'Pert PRO", manufactured by PANalytical, target: copper, Cu-Kα1 rays).

(Thermal Conductivity)

The thermal diffusivity [m$^2$/s] of a heat dissipation sheet was measured using a xenon flash analyzer ("LFA447 Nano-Flash", manufactured by NETZSCH). The value obtained by multiplying the measured value by the specific heat and density of the heat dissipation sheet was taken as the thermal conductivity [W/(m·K)] of the heat dissipation sheet in the thickness direction. The calculation was performed using theoretical values (room temperature (25° C.)), boron nitride 0.8 J/(g·K) and the resin component (derived from the base material) 1.8 J/(g·K), for the specific heat and theoretical values (room temperature (25° C.)), boron nitride 2.27 g/cm$^3$ and the resin component (derived from the base material) 1.17 g/cm$^3$, for the density.

A thermal conductivity of 13 W/(m·K) or more was determined as excellent thermal conductivity.

(Insulation Properties)

The insulation withstand voltage (breakdown voltage) [kV/mm] of a heat dissipation sheet was measured at a voltage rise rate of 0.1 kV/sec using a withstand voltage/insulation resistance measuring apparatus ("TOS9201/5101", manufactured by KIKUSUI ELECTRONICS CORPORATION).

The measurement value of the insulation withstand voltage in Example 3 was defined as 1 (standard) and those in other Examples and Comparative Examples were each represented as a relative ratio in the following Table 1. A relative ratio of 0.8 or more was determined as excellent insulation properties.

Various evaluation results of the h-BN powders and the heat dissipation sheets produced using such powders, in the above Examples and Comparative Examples, are collectively shown in Table 1.

TABLE 1

| | | Example 1 | Example 2 | Comparative Example 1 | Comparative Example 2 | Comparative Example 3 |
|---|---|---|---|---|---|---|
| h-BN powder | | Production Example 1 | Production Example 5 | Production Example 2 | Production Example 3 | Production Example 4 |
| Impurity elements [% by mass] | Boron | 18.66 | 21.22 | 55.90 | 0.05 | 0.06 |
| | Oxygen | 0.01 | 0.11 | 7.60 | 0.05 | 0.04 |
| Particle size distribution curve | | | | | | |
| Position of peak A [μm] | | 61.0 | 55.6 | 59.2 | 65.1 | 43.8 |
| a2/a1 | | 0.96 | 0.98 | 0.98 | 0.98 | 0.99 |
| D$_{50}$ (d1) [μm] | | 55.5 | 54.0 | 51.2 | 34.4 | 33.8 |

TABLE 1-continued

| | | | | | |
|---|---|---|---|---|---|
| $D_{50}$ (d2) [μm] | 51.7 | 49.6 | 42.6 | 27.1 | 21.1 |
| d2/d1 | 0.93 | 0.92 | 0.83 | 0.79 | 0.68 |
| BET specific surface area [m²/g] | 3.8 | 3.2 | 1.6 | 4.5 | 2.3 |
| Crystallite diameter [Å] | 336 | 318 | 282 | 400 | 475 |

| Heat dissipation sheet | Example 3 | Example 4 | Comparative Example 4 | Comparative Example 5 | Comparative Example 6 |
|---|---|---|---|---|---|
| I (002)/I (100) | 9.1 | 7.5 | 9.6 | 16.0 | 77.0 |
| Thermal conductivity [W/(m · K)] | 15 | 16 | 7 | 12 | 6 |
| Insulation withstand voltage (relative ratio) | 1 | 0.9 | 0.2 | 1.2 | 1.8 |

As seen from Table 1, it was noted that particles generated by boron suboxide were allowed to undergo a granulation step and a melting step, for surface-smoothing, and then subjected to nitridation-firing, to thereby obtain an h-BN powder having a predetermined particle size and being high in aggregation strength of aggregates of primary particles of h-BN, and the h-BN powder was used to thereby obtain a heat dissipation sheet excellent in thermal conductivity and insulation properties.

REFERENCE SIGNS LIST 11 a 50 mL glass beaker
12 a sample dispersion
13 the tip of the vibrator of an ultrasonic generator

The invention claimed is:

1. A hexagonal boron nitride powder comprising an aggregate of primary particles of hexagonal boron nitride,
    comprising boron as an impurity element at a content of 1.00 to 30.00% by mass and oxygen as an impurity element at a content of 0 to 1.00% by mass, and
    having a peak in a particle diameter range of 10.0 μm or more and less than 100.0 μm and a 50% volume cumulative particle diameter $D_{50}$ (d1) of 30.0 to 200.0 μm in a particle size distribution curve representing volume-based frequency distribution,
    wherein the hexagonal nitride powder has a structure such that, when the hexagonal boron nitride powder is ultrasonically treated under the following condition 1 for 1 minute, a ratio of a height (a1) of the peak before the ultrasonic treatment to a height (a2) of the peak after treatment, a2/a1, being 0.80 to 1.00 and a ratio of a 50% volume cumulative particle diameter $D_{50}$ (d1) before ultrasonic treatment to a 50% volume cumulative particle diameter $D_{50}$ (d2) after the ultrasonic treatment, d2/d1, being 0.80 to 1.00,
    [condition 1] a powder sample dispersion obtained by mixing 0.06 g of the hexagonal boron nitride powder, 0.005 g of a detergent ("Mama Lemon (registered trademark)", manufactured by Lion Corporation) and 50 g of water (20° C.) is placed in a 50 mL glass beaker having a barrel inner diameter of 40 mm and a height of 60 mm, and an end of a tip of a vibrator of an ultrasonic generator is set at a height of 1 cm from a bottom surface of a central portion of the beaker, and ultrasonic treatment is performed at an output of 150 W and an oscillation frequency of 19.5 kHz, and
    wherein the boron as an impurity element is a boron atom not bound to a nitrogen atom and which does not form a hexagonal boron nitride molecule.

2. The hexagonal boron nitride powder according to claim 1, having a BET specific surface area of 0.1 m²/g or more and less than 5.0 m²/g, and the primary particles each having a smooth surface.

3. The hexagonal boron nitride powder according to claim 1, having a crystallite diameter derived from a (002) plane of hexagonal boron nitride, as determined by powder X-ray diffraction measurement, of 250 Å or more and less than 375 Å.

4. The hexagonal boron nitride powder according to claim 1, having a BET specific surface area of 0.1 m²/g or more and less than 5.0 m²/g.

5. The hexagonal boron nitride powder according to claim 1, wherein the content of the boron as the impurity element is 5.00 to 28.00% by mass.

6. The hexagonal boron nitride powder according to claim 1, wherein the content of the boron as the impurity element is 10.00 to 25.00% by mass.

7. A composition comprising a base material comprising one or two or more selected from the group consisting of a resin and a rubber, and the hexagonal boron nitride powder according to claim 1.

8. A heat dissipation material comprising the composition according to claim 7.

9. The heat dissipation material according to claim 8, being a heat dissipation sheet.

10. The heat dissipation material according to claim 9, wherein a ratio of a diffraction peak intensity (I(002)) of a (002) plane to a diffraction peak intensity (I(100)) of a (100) plane, I(002)/I(100), of primary particles of hexagonal boron nitride, as determined in a direction perpendicular to a thickness direction of the heat dissipation sheet by X-ray diffraction measurement, is 7.0 to 15.

11. A method for producing the hexagonal boron nitride powder according to claim 1, comprising:
    step 1 of preparing a mixed powder comprising a boron powder and one or two or more boron compounds selected from the group consisting of a boron oxoacid and boron oxide,
    step 2 of calcining the mixed powder under a noble gas atmosphere at 1200° C. or more and less than 1800° C. to obtain a calcined powder,
    step 3 of granulating the calcined powder to obtain a granulated powder having a particle diameter of 10 to 200 μm,
    step 4 of melting the granulated powder under a noble gas atmosphere at 1800 to 2300° C. to obtain a molten powder, and step 5 of firing the molten powder under a nitrogen gas atmosphere at 2000 to 2300° C. to obtain a hexagonal boron nitride powder.

12. The method for producing the hexagonal boron nitride powder according to claim 11, wherein the calcined powder obtained in the step 2 comprises boron suboxide.

13. The method for producing the hexagonal boron nitride powder according to claim 11, wherein in the step 3, at least any of boron oxide and hexagonal boron nitride is added to the calcined powder for granulation.

\* \* \* \* \*